United States Patent [19]

Schubert

[11] 4,399,736
[45] Aug. 23, 1983

[54] VACUUM SUSPENDED BRAKE BOOSTER CONTROL VALVE

[75] Inventor: Malvin L. Schubert, Kettering, Ohio

[73] Assignee: General Motors Corporation, Detroit, Mich.

[21] Appl. No.: 237,528

[22] Filed: Feb. 23, 1981

[51] Int. Cl.³ .................... F15B 9/10; F15B 13/04
[52] U.S. Cl. .................... 91/469; 91/376 R; 137/627.5
[58] Field of Search .............. 91/469, 369 R, 369 A, 91/369 B, 376 R, 374; 137/627.5; 251/333

[56] References Cited

U.S. PATENT DOCUMENTS

| 3,357,311 | 12/1967 | Cripe ............................ 91/32 |
| 3,410,178 | 11/1968 | Kytta ........................... 91/369 |
| 3,727,516 | 4/1973 | Myers et al. ................. 91/376 |
| 3,972,263 | 8/1976 | Welsh, Jr. ..................... 91/6 |
| 3,974,741 | 8/1976 | Ohmi ......................... 91/376 R |
| 4,085,656 | 4/1978 | Ando ........................ 137/627.5 |
| 4,188,013 | 2/1980 | Battersby et al. ........... 251/333 |
| 4,309,935 | 1/1982 | Belart ....................... 91/376 R |
| 4,350,076 | 9/1982 | Thiel ........................ 91/376 R |

FOREIGN PATENT DOCUMENTS 2024967  1/1980  United Kingdom ............ 91/376 R

Primary Examiner—Martin P. Schwadron
Assistant Examiner—Richard L. Klein
Attorney, Agent, or Firm—D. D. McGraw

[57] ABSTRACT

The floating control valve of a vacuum operated booster has a recess or groove and a smaller steel washer which allows the seating portion of the control valve to seek its own plane. The insert is linearly aligned with the air valve seat. The outer portion of the control valve aligned with the vacuum valve seat on the power piston is not supported by the steel insert. The groove is positioned radially between the portions of the floating control valve engaging the two seats and may be on either the front or the rear side of the floating control valve.

4 Claims, 4 Drawing Figures

VACUUM SUSPENDED BRAKE BOOSTER CONTROL VALVE

The invention relates to a control valve arrangement for a vacuum suspended brake booster, and more particularly to one which provides improved sealing of the vacuum and air valves with the floating control valve under conditions of rest, poise and booster actuation.

In vacuum suspended brake boosters it is usual to have a linearly movable air valve seat connected to be moved by an input push rod. The valve seat is made as part of a piston-like element slidable in a power wall piston and arranged generally concentrically within the vacuum valve seat formed as a part of the piston. A floating control valve is mounted so as to be able to move linearly relative to the air valve seat and the vacuum valve seat under various conditions of operation and to engage either or both of those valve seats depending upon the particular condition of operation required. At rest the air valve seat is in sealing contact with the floating control valve and seals the variable pressure chamber against entry of atmospheric air. The vacuum valve seat is not in engagement with the floating control valve so that vacuum from the vacuum pressure chamber is also found in the variable pressure chamber of the booster. During initial booster actuation the air valve is pushed forward and the floating control valve moves with it until it contacts the vacuum valve seat on the power piston. This position is referred to as the poise position. Additional forward movement of the air valve opens the air valve seat relative to the floating control valve and allows atmospheric air to enter the booster variable pressure chamber, setting up a pressure differential across the booster power wall to actuate the booster. When the booster is actuated to the desired extent, the vacuum valve seat has moved forward to such an extent that the floating control valve again engages the air valve seat, thus establishing the valve in the poise position. This valve position will exist when the vehicle operator is exerting a steady force on the brake pedal with his foot to maintain a constant brake pressure. The air valve may be moved forwardly to obtain additional brake pressure to such an extent that full atmospheric air pressure is obtained in the variable pressure chamber and the booster has been actuated to its maximum extent. This condition is known as runout.

It has been found that with automotive engines of a smaller size and the consequent production of less intake manifold vacuum available for brake booster operation, any minor leakage that may occur in the poise position can contribute to reduced engine and engine emission control performance as well as reduced vacuum brake booster performance. In order to increase efficiency, a modified control valve arrangement which is the subject of the invention herein disclosed and claimed has been provided. The modified valve arrangement has a floating control valve body including a rubber ring molded around a stiff insert which provides stiffening of the air valve seating area and controlled flexibility for the outer portion of the floating control valve. This is accomplished by a reduced outer diameter insert which does not extend radially outwardly to the effective diameter of the vacuum valve seat. The flexibility is also controlled as needed by providing a recess or undercut in the floating control valve rubber body to provide improved sealability at poise and runout positions.

Another feature of the invention is the relocation of the air valve spring from the forward side of the air valve body to the input push rod so that the air valve spring pulls on the air valve body. The ball-and-socket connection between the air valve body and the push rod allows the air valve body to seek its own plane.

The floating control valve spring is applied directly against the insert in the floating control valve body rather than through the rubber, thereby contributing to a more even loading of the floating control valve by the force of the valve spring, further contributing to more positive sealing under various conditions of operation.

In the drawing

Figure 1:
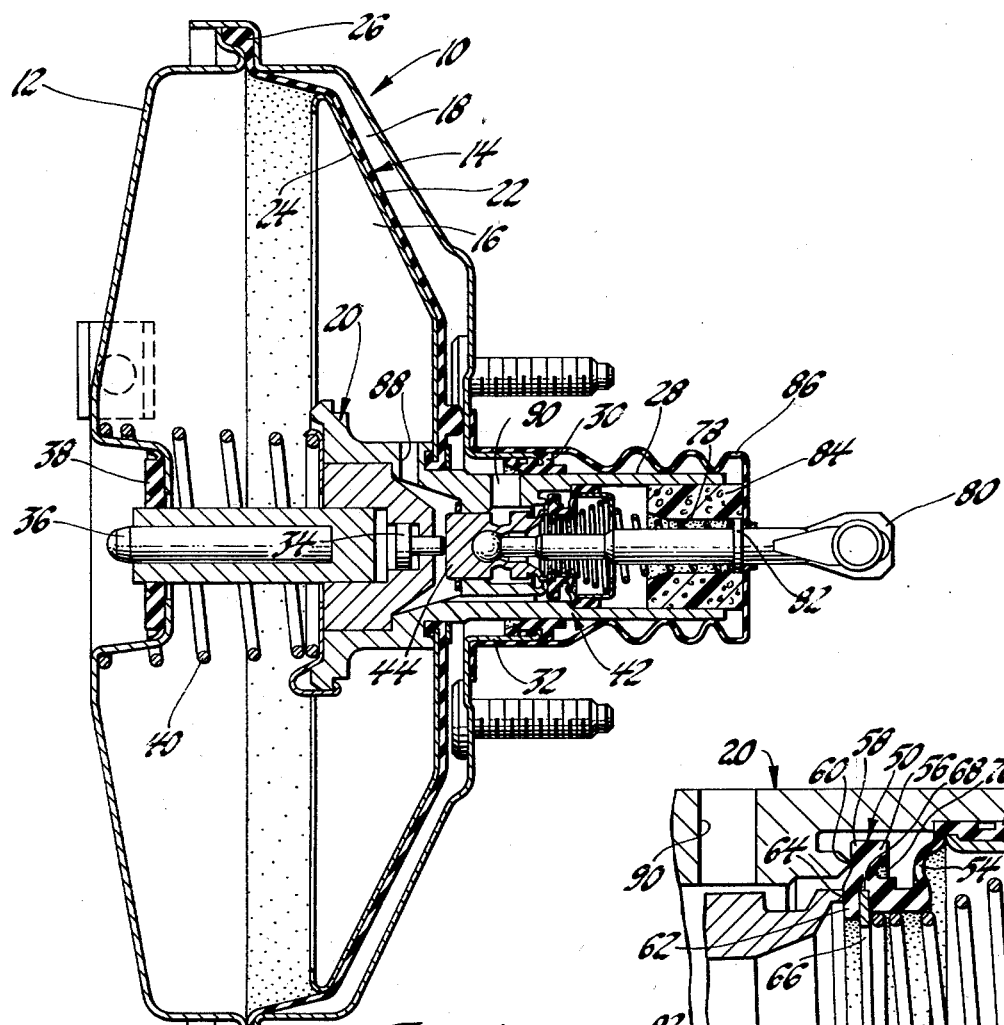
FIG. 1 is a cross section view of a vacuum suspended brake booster having the control valve arrangement embodying the invention incorporated therein.

The vacuum suspended brake booster 10 includes a housing 12 divided by a power wall 14 into a vacuum pressure chamber 16 and a variable pressure chamber 18. A suitable connection, not shown, communicates engine intake manifold vacuum into chamber 16. The power wall 14 includes a piston 20 on which a diaphragm 22 is suitably secured. A diaphragm support member 24 is also secured to piston 20. The diaphragm outer diameter 26 is secured to the outer peripheral portions of the walls forming housing 12.

Piston 20 is sealingly and reciprocably mounted within housing 12 and has a rearward extension 28 which passes through a seal 30 and a housing rearward extension 32. The forward end of piston 20 has a reaction mechanism 34 and an output rod 36. Rod 36 extends through a seal 38 in the forward wall of housing 12 and is arranged to actuate a master cylinder, not shown. The piston return spring 40 is located in vacuum pressure chamber 16 and urges the piston 20 rearwardly.

The control valve assembly 42 is contained within the piston rearward extension 28. It includes the air valve body 44 which is reciprocably mounted within piston extension 28 and has the annular air valve seat 46 formed thereon. The vacuum valve seat 48 is formed as a part of the piston extension 28, is annular, and is positioned generally concentrically outward of the air valve seat 46. The floating control valve body 50 includes a mounting ring 52 by which the valve body is mounted within piston extension 28. A diaphragm-like flexible connection 54 connects mounting ring 52 to the valve ring 56. The valve ring is positioned in axial alignment with the air valve seat 46 and the vacuum valve seat 48 and is axially movable within the piston extension 28. The valve ring has an outer portion 58 providing a valve face surface 60 aligned for sealing engagement and disengagement with the vacuum valve seat 48. The valve ring 56 has a ring inner portion 62 provided with a valve face surface 64 which is aligned axially with the air valve seat 46 for sealing engagement and disengagement. A stiff annular ring 66 is molded in the valve ring inner portion 62 so that its outer periphery 68 does not extend radially outward to the ring outer portion 58, and is therefore radially inward of the vacuum valve seat 48. Ring 66 is in axial alignment with the air valve seat 46 back of valve face surface 64, and also extends radially inward beyond the inner surface of the valve ring 56 so as to act as a spring seat for one end of the floating control valve spring 70. A spring cup 72 is secured to the valve body mounting ring 52 on the inner side thereof and has a rearwardly positioned radially inwardly extending flange 74 which acts as a seat for the other end of spring 70. Thus spring 70 continually urges the valve ring 56 toward the air valve seat 46 and vacuum valve seat 48 relative to the mounting ring 52 and piston extension 28. The flexible connection 54 permits movement of the valve ring 56 relative to the mounting ring 52. The valve ring 56 is also provided with an annular recess or undercut 76 located between the valve ring outer portion 58 and inner portion 62 so as to provide controlled flexibility to the outer portion. The recess may be provided on the rear side of the valve ring 56, as illustrated, or in some arrangements may be provided on the front side.

The air valve spring 78 is positioned rearwardly of flange 74 of spring cup 72. The input push rod 80 is operatively attached at its rearward end for brake pedal operation in a manner well known in the art and not further illustrated. Rod 80 extends through the spring 78, the cup 72, the spring 70, and the valve body 50. Its forward end terminates in a ball-and-socket joint within the air valve body 44. This joint is such that force may be transferred between the push rod 80 and the air valve body 44 in either direction. A flange 82 formed on the push rod 80 acts as a spring seat for air valve spring 78. Spring 78 is under compression so that it urges the input push rod 80 rearwardly, exerting a pulling force on the air valve body 44. The ball-and-socket arrangement between the air valve body 44 and the push rod 80 allows the air valve body to seek its own plane and effectively prevents a cocking action of the valve body within the piston extension 28.

A suitable air filter 84 and boot 86 are provided at the rear portion of the booster assembly so that atmospheric air entering the booster is relatively clean and the valve elements are protected.

Figure 4:
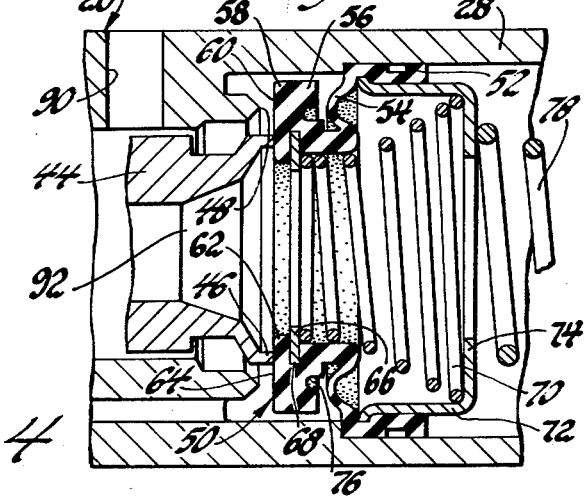
FIG. 4 is a cross section view of the control valve arrangement similar to FIG. 2 and illustrates the valve arrangement in the rest position.

When the booster assembly of FIG. 1 is at rest, the control valve assembly 42 is in the position shown in FIG. 4. In this arrangement the air valve body 44 is positioned rearwardly so that the air valve seat 46 is in sealing engagement with the valve face surface 64. The air valve spring 78 is sufficiently stronger than the floating control valve spring 70 so as to exert a force through the air valve body 44 and the floating control valve body 50, tending to further compress spring 70. This has provided sufficient rearward movement of the floating control valve body 50 to disengage the valve face surface 60 from the vacuum valve seat 48. This opens the connection by way of power piston passages 88 and 90 between the vacuum pressure chamber 16 and the variable pressure chamber 18, while preventing atmospheric air from passing the air valve seat 46. Thus vacuum pressure is found in both chambers 16 and 18.

Figure 2:
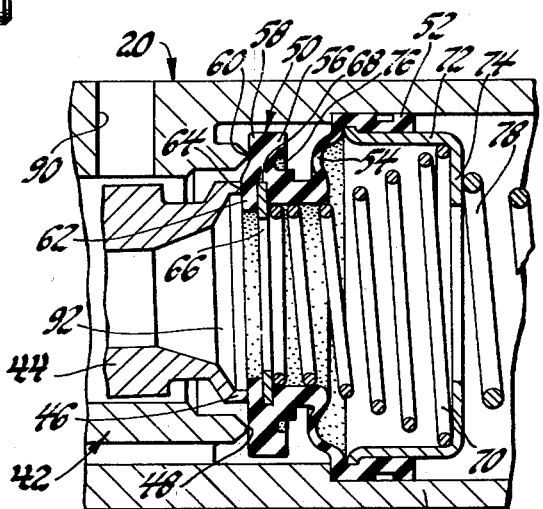
FIG. 2 is an enlarged cross section view of the control valve arrangement embodying the invention and particularly illustrates the valve arrangement in the poise position.

When the vehicle operator actuates the brake booster, he causes the input push rod 80 to move forwardly, moving the air valve body 44 forwardly. The floating control valve body 50 will move forwardly with the air valve body, maintaining sealing contact against the air valve seat 46. The valve body 50 will engage the vacuum valve seat 48 in sealing engagement, thus closing off the communication between chambers 16 and 18. The valve assembly is then in the poise position illustrated in FIG. 2. Should there be any problem of alignment between the air valve seat 46, the vacuum valve seat 48, and the floating control valve body 50, the controlled flexibility of the valve body 50 as provided by the recess 76 and the location of ring 66 will permit the valve body 50 to flexibly adapt to full sealing engagement with the vacuum valve seat 48. Such flexible adaptation is illustrated in FIG. 2 with some over emphasis on the amount of deformation typically occurring in the control valve body 50.

Figure 3:
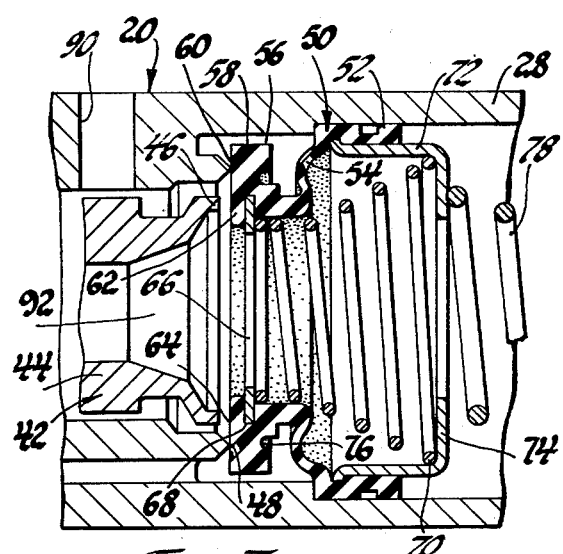
FIG. 3 is a cross section view of the control valve arrangement similar to FIG. 2 and illustrates the valve arrangement in the booster actuating or runout position.

Further forward movement of push rod 80 and air valve body 44 causes the air valve seat 46 to move away from the valve face surface 64, opening the connection of atmospheric air from the air chamber 92, formed within the air valve body 44 and the control valve body 50 and the piston extension 28, so that atmospheric air enters the variable pressure chamber 18 through passage 90. This increases the absolute pressure on the rear side of power wall 14, moving the power wall, including piston 20, forwardly. This movement compresses the piston return spring 40 and moves the output rod 36 to actuate the master cylinder. The control valve assembly is in the condition shown in FIG. 3 during this portion of the booster actuation.

As the piston 20 moves leftwardly, vacuum valve seat 48 moves with it and the floating control valve 50 follows until the poise position of FIG. 2 is once again obtained. The vehicle operator may hold the brakes in the applied position with a substantially constant brake application force by holding the control valve assembly 42 in the poise position. If he requires the maximum amount of braking force, he may move the air valve body 44 forward to such an extent that full atmospheric air pressure is exerted in chamber 18 with the air valve seat 46 remaining disengaged from the valve face surface 64. This is the runout position also illustrated in FIG. 3.

Upon release of the brake pedal by the vehicle operator, the air valve spring 78 will move the push rod 80 and the air valve body 44 rearwardly. The air valve seat 46 picks up the control valve body 50 and moves it rearwardly, disengaging the valve face surface 60 from the vacuum valve seat 48. This reestablishes communication between chambers 16 and 18, and the atmospheric air in chamber 18 is evacuated through passages 90 and 88 and chamber 16. This decreases the differential pressure acting on power wall 14, and return spring 40 moves the power wall rearwardly to the brake release position. This removes the actuating force exerted by rod 36 on the master cylinder, releasing the vehicle brakes.

The control valve assembly embodying the invention provides for controlled flexibility to the outer portion of the floating control valve body, thus providing improved sealability at poise, brake actuation and runout positions. It provides flexibility to the outer sealing area only. The inner portion is rather stiff to provide for a minimal amount of indentation by the air valve seat due to time and force from the air valve spring, and to allow the air valve seat to be the controlling portion. The outer portion of the floating control valve body is free to align itself with the vacuum valve seat and to correct for any misalignment within the control valve assembly. The characteristics of the outer portion controlled flexibility are defined and maintained by the outer diameter of the insert ring 66 and the amount of indentation provided in the rubber-like material of the floating control valve body. The indentation established by the recess 76 can be located on either side of the valve ring 56.

The embodiments of the invention in which an exclusive property or privilege is claimed are defined as follows:

1. A floating control valve body for a vacuum suspended brake booster, said valve body being adapted for axial and limited pivotal movements to accommodate minor misalignments, said valve body comprising:
   a rubber-like molded annular valve ring having radially spaced and substantially concentric inner and outer portions with coplanar annular valve face surfaces relatively movable with respect to an annular air valve seat and an annular vacuum valve seat for respectively selective sealing engagement with said annular air valve seat and said annular vacuum valve seat,
   an annular reinforcing ring molded in said valve ring inner portion with the outer periphery of said reinforcing ring terminating radially inward of said valve ring outer portion and sufficiently hard and stiff to provide axially and circumferentially stiff reinforcement for said valve ring inner portion but not for said valve ring outer portion,
   and an axially opening annular recess formed in said valve ring radially between said valve ring inner and outer portions and providing flexibility of said outer portion relative to said inner portion to accommodate minor misalignment between said valve seats, thereby to assure full annular sealing engagement of said outer portion with the vacuum valve seat when such sealing engagement is selected.

2. In a vacuum suspended brake booster control valve mechanism having an annular vacuum valve seat formed on the booster power piston, an air valve received concentrically within said vacuum valve seat and reciprocably movable axially relative thereto, an annular air valve seat formed on said air valve concentrically within said vacuum valve seat, a brake booster input push rod pivotally secured to said air valve in generally axial alignment therewith for moving said air valve axially, an annular floating control valve mounted on the booster power piston and reciprocably movable axially relative to said valve seats and having spring means urging it toward said valve seats, said floating control valve being selectively sealingly engageable with either one or both of said valve seats, the improvement comprising:
   providing only the radially inner portion of said annular floating control valve, which is selectively engageable with said air valve seat, with an annular axial reinforcment ring, and providing flexibility of the radially outer portion of said annular floating control valve by means of an axially opening annular recess located at a radius greater than the radius of said air valve seat and at a radius less than said vacuum valve seat, the radially outer portion of said annular floating control valve being selectively engageable with said vacuum valve seat, relative to the radially inner portion thereof, assuring full sealing contact between said floating control valve and said vacuum valve seat when said floating control valve engages said vacuum valve seat,
   and air valve return spring means acting on said input push rod and, through said input push rod, exerting a continuous axially directed pulling force on said air valve toward said floating control valve to more easily maintain said air valve seat in parallel planar alignment with said vacuum valve seat and said floating control valve and minimize such parallel planar misalignment.

3. In a vacuum suspended brake booster having an annular vacuum valve seat formed on the booster power piston; an annular air valve seat formed on the air valve body and movable with the air valve body axially by the booster input push rod, that rod being connected to the air valve body through a swivel ball joint; a floating control valve body mounted on the booster power piston and movable axially to selectively engage either or both of the valve seats to selectively control the admission and presence of vacuum air pressure and atmospheric air pressure to the brake booster for booster actuation, poise and release; and spring means continuously urging the floating control valve body axially toward the valve seats relative to the booster power piston; the improvement comprising:
   said floating control valve body including a rubber-like molded annular valve ring having radially spaced substantially concentric inner and outer control valve portions with annular control valve face surfaces for respective selective sealing engagement with said air valve seat and said vacuum valve seat, an annular stiff insert ring molded in said inner control valve portion radially inward of said outer control valve portion and providing axial reinforcement only for said inner control valve portion and extending radially inward to provide a spring seat engaged by said spring means, and an annular recess formed radially outward of said inner control valve portion and radially inward of said control valve portion and providing a flexible annular wall portion joining said inner and outer control valve portions, said flexible annular wall portion allowing flexibility of said outer control valve portion relative to said inner control valve portion to accommodate minor misalignment therebetween and thus assure full annular sealing engagement of said outer control valve portion with said vacuum valve seat when such sealing engagement is selected.

4. In a vacuum suspended brake booster having an annular vacuum valve seat formed on the booster power piston; an annular air valve seat formed on the air valve body and movable with the air valve body axially by the booster input push rod, that rod being connected to the air valve body through a swivel ball joint; a floating control valve body mounted on the booster power piston and movable axially to selectively engage either or both of the valve seats to selectively control the admission and presence of vacuum air pressure and atmospheric air pressure to the brake booster for booster actuation, poise and release; and spring means continuously urging the floating control valve body axially toward the valve seats relative to the booster power piston; the improvement comprising:
   said floating control valve body including a rubber-like molded annular valve ring having radially spaced substantially concentric inner and outer control valve portions with annular control valve face surfaces for respective selective sealing engagement with said air valve seat and said vacuum valve seat, an annular stiff insert ring molded in said inner control valve portion radially inward of said outer control valve portion and providing axial reinforcement only for said inner control valve portion and extending radially inward to provide a spring seat engaged by said spring means, and an annular recess formed radially intermediate said inner and outer control valve portions to provide a flexible annular wall portion joining said inner and outer control valve portions, said flexible annular wall portion allowing flexibility of said outer control valve portion relative to said inner control valve portion to accommodate minor misalignment therebetween and thus assure full annular sealing engagement of said outer control valve portion with said vacuum valve seat when such sealing engagement is selected;

and an air valve spring acting on said input push rod and continuously exerting a force on said input push rod and through it on said air valve body urging said air valve body toward said floating control valve body, permitting said swivel ball joint to allow said air valve body to seek an axially aligned position relative to said vacuum valve seat and minimize cocking of said air valve seat relative to said vacuum valve seat.

* * * * *

UNITED STATES PATENT AND TRADEMARK OFFICE
CERTIFICATE OF CORRECTION

PATENT NO. : 4,399,736

DATED : August 23, 1983

INVENTOR(S) : Malvin L. Schubert

It is certified that error appears in the above—identified patent and that said Letters Patent is hereby corrected as shown below:

Column 5, line 54, "reinforcment" should read -- reinforcement --.

Column 6, line 36, after "said" insert -- outer --.

Signed and Sealed this

First Day of May 1984

[SEAL]

Attest:

GERALD J. MOSSINGHOFF

Attesting Officer

Commissioner of Patents and Trademarks